United States Patent
Charbonnel

(10) Patent No.: US 6,761,395 B2
(45) Date of Patent: Jul. 13, 2004

(54) HYBRID SUPPORTING STRUCTURE FOR A VEHICLE DASHBOARD, AND PROCESS FOR MANUFACTURING THE SAME

(75) Inventor: Daniel Charbonnel, Chanteloup les Vignes (FR)

(73) Assignee: Denso Thermal Systems SpA, Turin (IT)

(*) Notice: Subject to any disclaimer, the term of this patent is extended or adjusted under 35 U.S.C. 154(b) by 0 days.

(21) Appl. No.: 10/396,567

(22) Filed: Mar. 26, 2003

(65) Prior Publication Data

US 2003/0227195 A1 Dec. 11, 2003

(30) Foreign Application Priority Data

Mar. 27, 2002 (EP) ............................................. 02425188

(51) Int. Cl.[7] .......................... B62D 25/14; B62D 29/00
(52) U.S. Cl. ....................................... 296/208; 296/70
(58) Field of Search ...................... 296/70, 208, 193.02, 296/193.09, 72; 180/90

(56) References Cited

U.S. PATENT DOCUMENTS 6,203,092 B1 * 3/2001 Yoshinaka ................... 296/70
6,250,678 B1 * 6/2001 Yoshinaka et al. .......... 280/752
6,676,202 B2 * 1/2004 Brancheriau ................ 296/208
2003/0122404 A1 * 7/2003 Duchez ....................... 296/208

FOREIGN PATENT DOCUMENTS

| DE | 42 32 847 A1 | 3/1994 |
| DE | 196 26 441 A1 | 1/1998 |
| EP | 1 149 717 A1 | 10/2001 |

* cited by examiner

Primary Examiner—D. Glenn Dayoan
Assistant Examiner—Patricia Engle
(74) Attorney, Agent, or Firm—Sughrue Mion, PLLC

(57) ABSTRACT

A hybrid supporting structure for a vehicle dashboard, including:
- a metal cross member (10) having an elongated shape along a principal axis (12);
- an air-distribution duct (18) made of plastic material, including at least one duct of elongated shape (20), which extends parallel to the metal cross member (10), and an air-distribution box (22) anchored to the metal cross member (10) by co-moulding; and
- at least one support (28, 30) made of plastic material, anchored to the metal cross member (10) by co-moulding and connected to said air-distribution duct (20) so as to allow freedom of relative movement between the duct (20) and the support (28, 30) in a direction parallel to said principal axis (12).

7 Claims, 4 Drawing Sheets

Fig_4
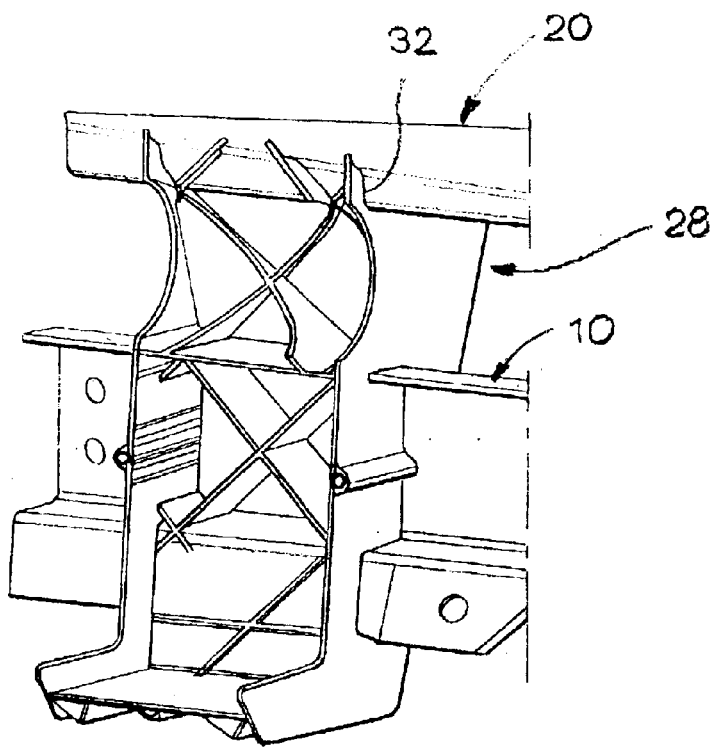
Fig_5
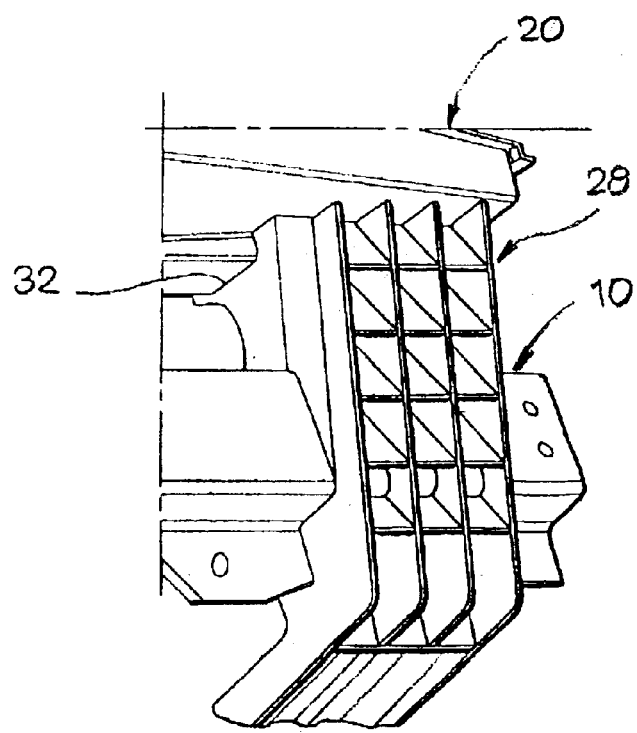

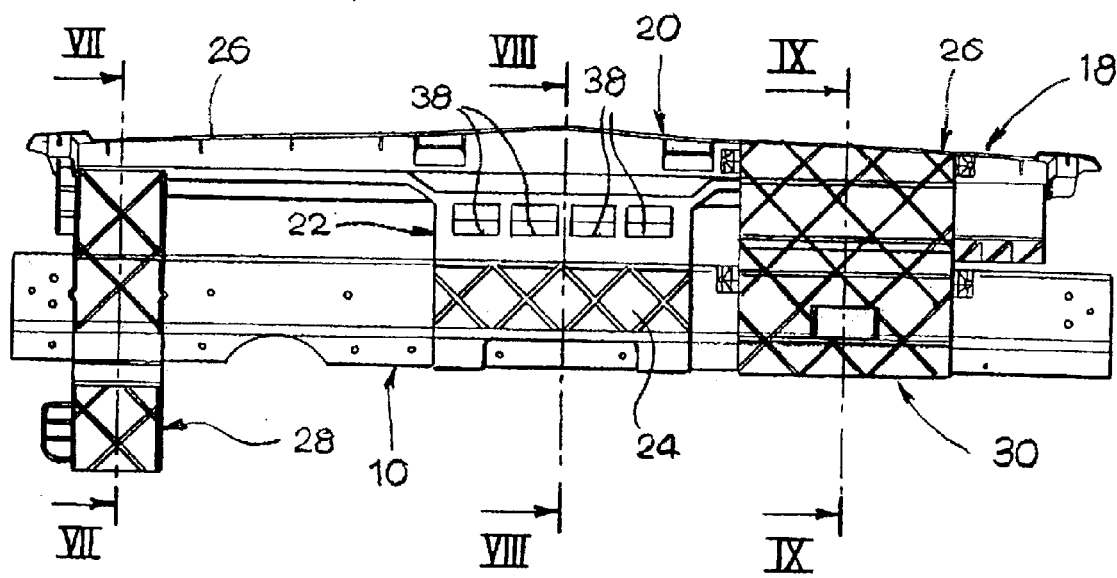
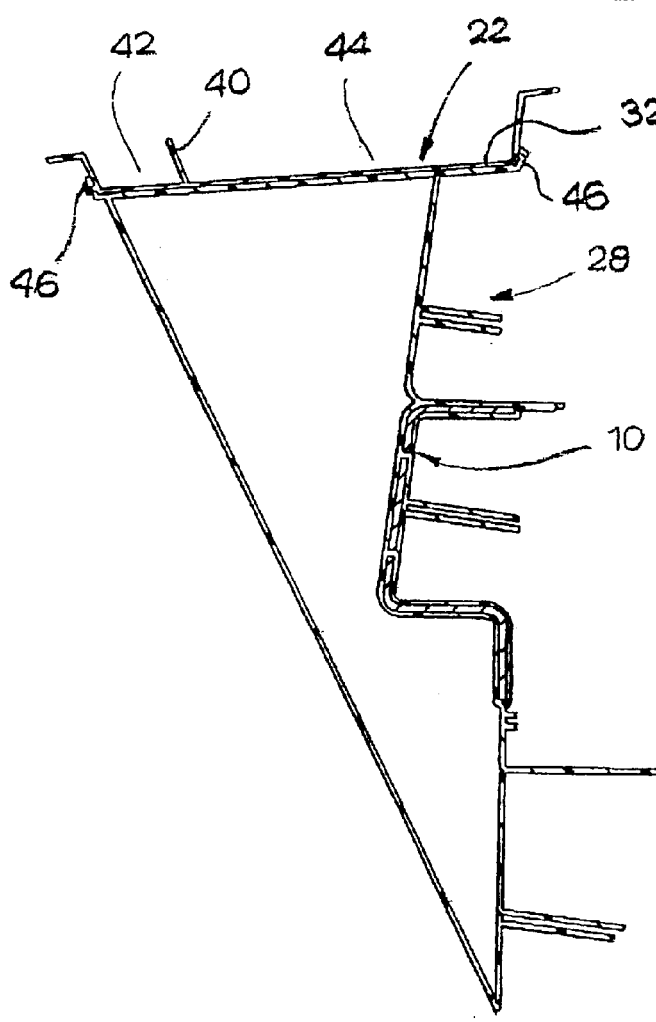

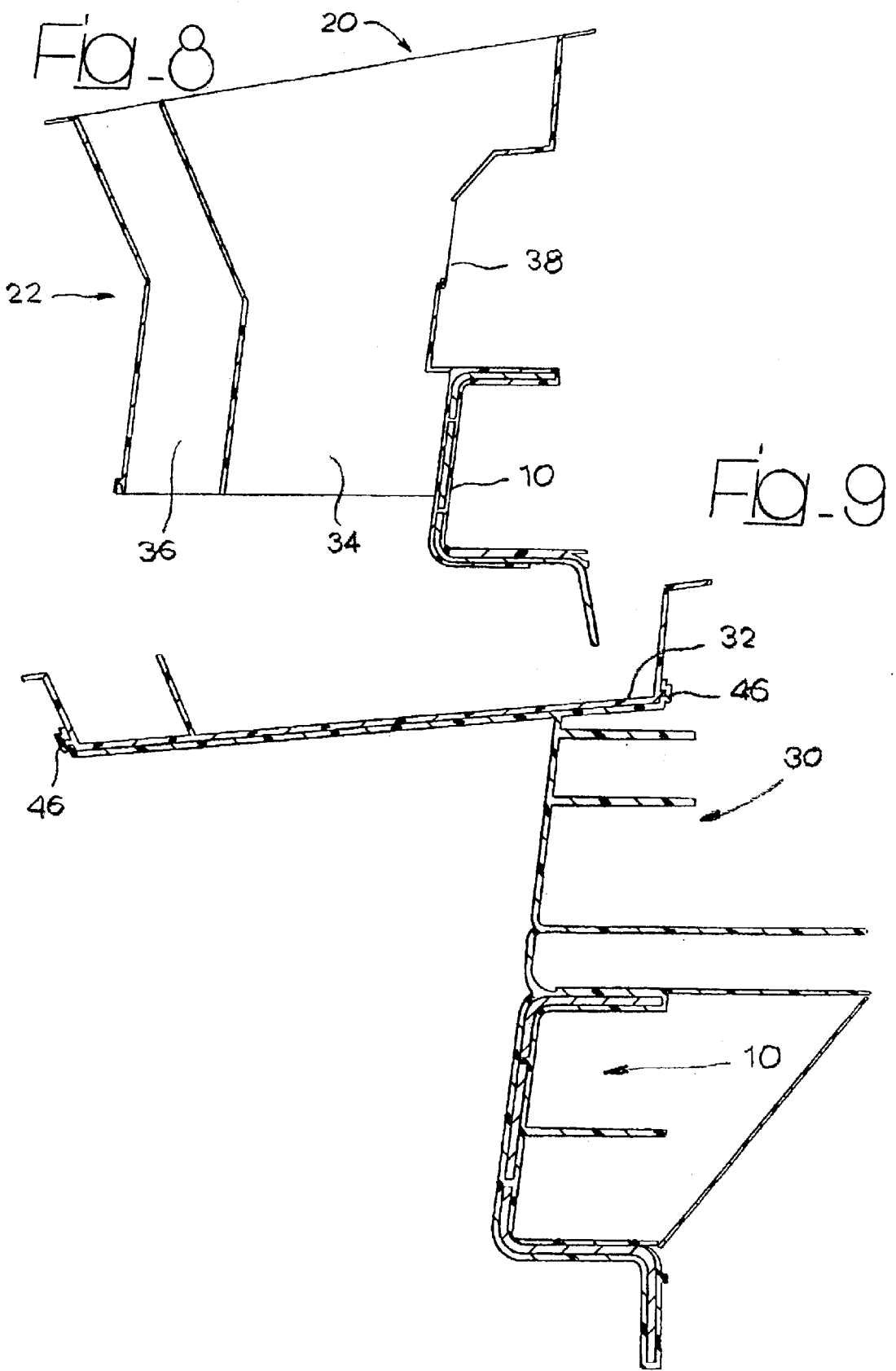

HYBRID SUPPORTING STRUCTURE FOR A VEHICLE DASHBOARD, AND PROCESS FOR MANUFACTURING THE SAME

BACKGROUND OF THE INVENTION

The present invention relates in general to the automobile industry and regards a hybrid supporting structure for a vehicle dashboard and a process for manufacture thereof.

The dashboard of a vehicle is a complex unit, which comprises multiple devices and controls, such as the instrument panel, the assembly for air distribution inside the vehicle passenger compartment, the control panel for the air-distribution assembly, the airbag module, etc. The supporting structure of a dashboard comprises a cross member made of bent sheet metal having an elongated shape along a principal axis and designed to be fixed to the vehicle body. The said cross member constitutes a load-bearing element for supporting the entire dashboard assembly. Hybrid supporting structures are known, in which plastic material is co-moulded on the metal cross member to form an air-distribution assembly and fixing areas on which there are to be installed, for instance, an air-bag module and various electrical or electronic components or devices forming part of the dashboard assembly. In particular, the air-distribution assembly comprises a distribution duct which extends parallel to the cross member and a distribution box defining one or more chambers that communicate with the duct. The air-distribution assembly is obtained by means of injection of plastic material and is anchored on the cross member by co-moulding, i.e., by injection of plastic material on the metal cross member.

One of the problems that are encountered in producing a hybrid supporting structure of this type is represented by the different coefficient of thermal expansion of the cross member and of the plastic material co-moulded thereon. When the dashboard assembly is installed on a vehicle, the heating and cooling cycles produce a differentiated thermal expansion of the part of plastic material and of the metal part of the hybrid supporting structure. Thermal expansion of this sort produces stresses in the plastic material which can bring about its failure.

SUMMARY OF THE INVENTION

In order to overcome the aforesaid drawbacks, the subject of the present invention is a hybrid supporting structure for a vehicle dashboard, as well as a process for manufacture thereof, the said structure and process having the characteristics that form the subject matter of the ensuing claims.

BRIEF DESCRIPTION OF THE DRAWINGS

The characteristics and advantages of the present invention will emerge clearly from the ensuing detailed description, provided purely by way of non-limiting example, with reference to the attached figures, in which:

FIGS. 4 and 5 are front and rear perspective views, respectively, of the part indicated by the arrow IV in FIG. 3;

FIG. 6 is a front elevation of the supporting structure according to the present invention; and FIGS. 7, 8 and 9 are cross sections taken along the lines VII—VII, VIII—VIII and IX—IX, respectively, of FIG. 6.

DETAILED DESCRIPTION OF THE INVENTION

Figure 1:
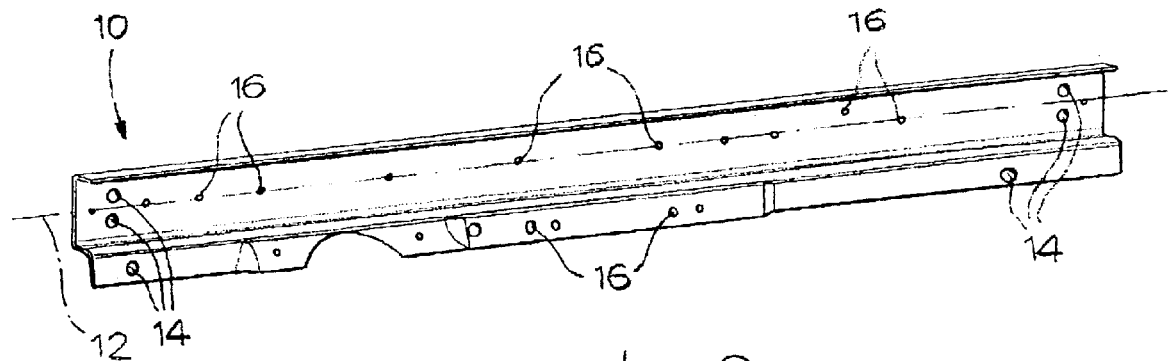
FIGS. 1 to 3 are schematic representations of a process for the production of a hybrid supporting structure according to the present invention.
Figure 2:
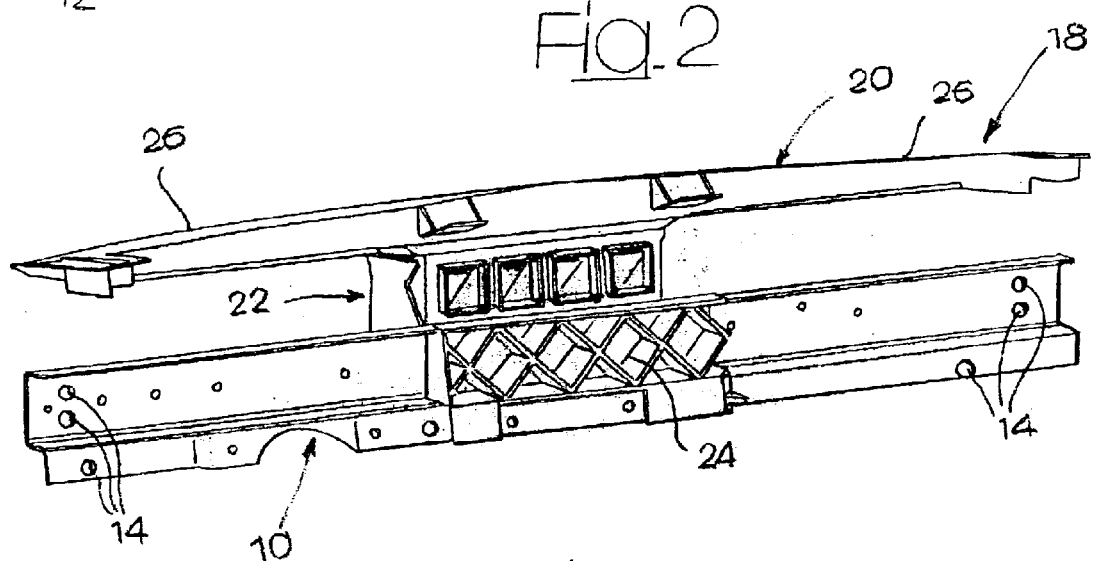
Figure 3:
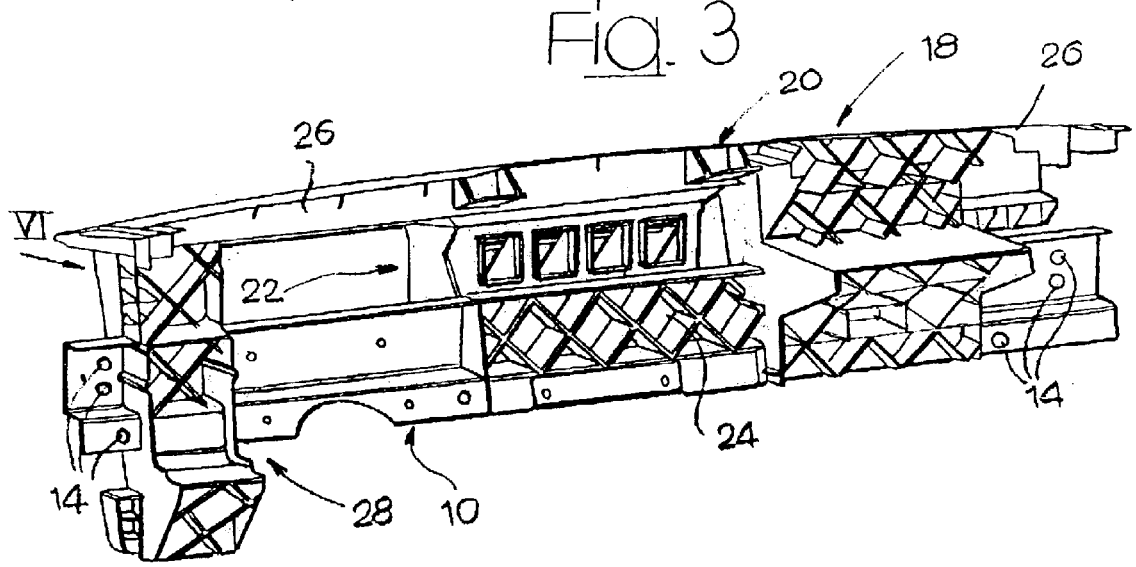

With reference to FIGS. 1 to 3, a hybrid supporting structure according to the present invention is produced starting from a cross member 10 made of bent sheet metal having a generally C-shaped cross section and an elongated shape along a principal axis designated by 12 in FIG. 1. The cross member 10 is provided with holes 14 for fixing it to the body of the vehicle and holes 16 for facilitating anchorage of co-moulded plastic material. The cross member 10 is inserted into the die of an injection-moulding apparatus (not illustrated), in which, in one moulding step, a first plastic material is injected into a first injection-moulding seat of the die, the said seat being designed to form an air-distribution assembly. FIG. 2 illustrates the component that is obtained at the end of this intermediate fabrication step. The air-distribution assembly is designated, as a whole, by 18 and comprises an air distribution duct 20, which extends parallel to the cross member 10, and a distribution box 22, formed in an integral way with the duct 20 and having a portion 24 co-moulded on a corresponding area of the cross member 10. As illustrated in FIG. 2, the distribution box 22 is anchored in a substantially central area of the cross member 10, and the distribution duct 20 has two side sections 26 that extend, in cantilever fashion, from the distribution box 22. The portion 24 for anchorage of the distribution box 22 completely surrounds the cross member 10 and is thermally fixed to the latter, without any possibility of relative movement.

In a subsequent step of the moulding process, a second plastic material of a type different from the plastic material that forms the air-distribution assembly 18 is injected in order to form at least one support anchored to the cross member 10 and connected, in the way which will be described in what follows, to a corresponding side portion 26 of the distribution duct 20. FIG. 3 illustrates the supporting structure according to the present invention at the end of this further moulding step. As may be seen from FIG. 3, in this second moulding step, a first support 28 and a second support 30 are formed, which are anchored, by means of co-moulding, to the cross member 10 on opposite sides with respect to the distribution box 22. Also the supports 28, 30 are firmly fixed to the cross member 10 without any possibility of movement with respect to the latter.

Preferably, the first injection-moulding step for moulding of the distribution assembly 18 and the second injection-moulding step for moulding of the supports 28, 30 are both carried out inside the same die. The two moulding steps are separate from one another in that the second moulding step takes place after the material injected with the first moulding step has already hardened. The two moulding steps can be carried out in reverse order with respect to what is described here, i.e., the supports 28, 30 can be injected first, and afterwards the distribution assembly 18 can be injection moulded. Preferably, the co-moulded parts made of plastic material are provided with stiffening ribs for increasing the stiffness of the structure. According to the present invention, the first and second moulding operations are performed in order to establish a mutual connection between the distribution duct 20 and the supports 28, 30, which allows freedom of relative movement in a direction parallel to the principal axis 12. This is achieved by creating a weld or chemical bond in the area of mutual connection between the support 28, 30 and the distribution duct 20. As will be illustrated in greater detail in what follows, the connecting surfaces between the supports 28, 30 and the distribution duct 20 are shaped so as to form a guide parallel to the cross member 10 which does not prevent relative movements between the connecting surfaces in a direction parallel to the principal axis 12. The connection in the form of a guide between the supports 28, 30 and the distribution channel 20 is moreover provided in order to prevent relative movements in directions orthogonal to the principal axis 12.

A particularly simple and effective way to obtain this type of connection consists in using plastic materials that are different and are not chemically compatible with one another to form the distribution assembly 18 and the supports 28, 30. Preferably, the two plastic materials are polymeric materials having different structures; for example, the first material may present an amorphous structure, whilst the second material may have a crystalline structure. By way of example, the plastic material forming the distribution assembly 20 may be acrylonitrile butadiene styrene (ABS) or else a mixture of ABS and polycarbonate, and the material constituting the supports 28, 30 may be polypropylene homopolymer or else polypropylene copolymer. The two supports 28, 30 have the function of connecting the side ends 26 of the distribution duct 20 to the metal cross member 10 and can, moreover, be used for fixing the devices or components that form part of the dashboard assembly. For instance, the support 28 can be used for fixing a fuse box (not illustrated), and the support 30 can be used for installing the air-bag assembly for the passenger.

FIGS. 4 and 5 illustrate the way in which one of the supports, in the case in point the support 28, is anchored by means of co-moulding to the cross member 10 and is connected to the distribution duct 26. The connecting surface between the duct 20 and the support 28 is designated by 32. In this area, one of the two plastic materials is injected on the outer surface of the other material that has already been formed and, thanks to the different nature of the plastic material, no chemical bond nor any fusion is set up between the two materials. The connecting surface may have a substantially C-shaped form arranged in such a way as to leave freedom of relative sliding in the direction of the main axis of the metal cross member 10.

Further constructional details of the supporting structure according to the present invention are illustrated in FIGS. 6 to 9. In particular, in FIG. 8 it may be noted that the distribution box 22 defines a main distribution chamber 34 and a distribution chamber for the demisting/defrosting air flow 36. Both of the chambers 34, 36 communicate, at the top, with the distribution duct 20. The main distribution chamber 34 further communicates with openings 38 for the distribution of the air flow to front distribution outlets. In FIGS. 7 and 8, it may be noted that the distribution duct 20 is open at the top and is designed to be closed at the top of the dashboard (not illustrated). The distribution duct 20 has a longitudinal diaphragm 40, which divides the duct 20 into a distribution channel for demisting/defrosting-air flow 42 and into a diffused-air distribution channel 44. As may be seen in FIGS. 7 and 9, on the connecting surface 32 between the supports 28, 30 and the channel 20, longitudinal ribs 46 may be provided parallel to the cross member 10 in such a way that the connection between each of the supports 28, 30 and the distribution duct 20 is rigid in directions orthogonal to the cross member 10, and there exists the possibility of relative movement only in a direction parallel to the cross member 10.

When the supporting structure according to the present invention is subjected to a variation in temperature, the predominant thermal expansion is in the direction of the cross member 10. Since the metal material forming the cross member 10 and the plastic material forming the distribution duct 20 have coefficients of thermal expansion that are different from one another, these components will be subject to differentiated thermal expansion along the axis of the cross member 10. Thanks to the mobile connection between the supports 28, 30 and the distribution duct 20, the supporting structure as a whole is free to undergo deformation in a differentiated way, without any stresses being induced in the plastic material. In particular, the parts that are rigidly anchored to the cross member move together with the latter in the direction of the main axis, and the movements of differentiated thermal expansion are concentrated in the areas of connection between the duct 20 and the supports 28, 30. In these areas, there may be relative movements in the region of ±3 mm.

What is claimed is:

1. A hybrid supporting structure for a vehicle dashboard, comprising:

a metal cross member (10) having an elongated shape along a principal axis (12); and an air-distribution duct (18) made of plastic material, including at least one duct of elongated shape (20), which extends parallel to the metal cross member (10), and an air-distribution box (22) anchored to the metal cross member (10) by co-moulding, characterized in that it comprises at least one support (28, 30) made of plastic material, anchored to the metal cross member (10) by co-moulding and connected to said air-distribution duct (20) so as to allow freedom of relative movement between the duct (20) and the support (28, 30) in a direction parallel to said principal axis (12).

2. The structure according to claim 1, characterized in that the distribution duct (20) and said support (28, 30) are connected together by means of a guide surface (32), which allows for relative sliding in a direction parallel to the principal axis (12).

3. The structure according to claim 2, characterized in that the guide surface (32) prevents relative movements in directions orthogonal to the aforesaid principal axis (12).

4. The structure according to claim 1, characterized in that the distribution duct (26) and said support (28, 30) are made of plastic materials that are different and are not chemically compatible with one another.

5. The structure according to claim 4, characterized in that a first one of said plastic materials presents an amorphous structure, and a second one of said plastic materials presents a crystalline structure.

6. The structure according to claim 5, characterized in that the plastic material of amorphous structure comprises ABS or a mixture of ABS and polycarbonate.

7. The structure according to claim 5, characterized in that the plastic material of crystalline structure comprises polypropylene homopolymer or polypropylene copolymer.

* * * * *